(12) United States Patent
Grantham et al.

(10) Patent No.: US 12,502,918 B2
(45) Date of Patent: Dec. 23, 2025

(54) MOVABLE TOW HOOK ASSEMBLIES AND VEHICLES INCLUDING SAME

(71) Applicant: Toyota Motor Engineering & Manufacturing North America, Inc., Plano, TX (US)

(72) Inventors: Haley L. Grantham, Saline, MI (US); Aaron R. Steinhilb, Milan, MI (US); Jeremiah T. Hammer, Ann Arbor, MI (US); Troy N. Grantham, Saline, MI (US); Paxton S. Williams, Milan, MI (US); Hailan Hu, Sylvania, OH (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 79 days.

(21) Appl. No.: 18/415,140

(22) Filed: Jan. 17, 2024

(65) Prior Publication Data
US 2025/0229584 A1 Jul. 17, 2025

(51) Int. Cl.
*B60D 1/04* (2006.01)
*B60D 1/24* (2006.01)
*B60D 1/54* (2006.01)

(52) U.S. Cl.
CPC ............... *B60D 1/54* (2013.01); *B60D 1/04* (2013.01); *B60D 1/243* (2013.01); *B60D 1/246* (2013.01)

(58) Field of Classification Search
CPC .......... B60D 1/04; B60D 1/243; B60D 1/246; B60D 1/54; B60D 2001/1544

USPC ..................................................... 701/36, 49
See application file for complete search history.

(56) References Cited

U.S. PATENT DOCUMENTS

| | | | |
|---|---|---|---|
| 7,497,458 B2 | 3/2009 | Daniel | |
| 8,016,314 B2 | 9/2011 | Visser | |
| 10,464,382 B2* | 11/2019 | Ghannam | B60D 1/167 |
| 11,420,695 B2 | 8/2022 | Viele et al. | |
| 2006/0189229 A1* | 8/2006 | Parten | B63B 34/54 |
| | | | 441/65 |
| 2018/0208006 A1* | 7/2018 | Farooq | B60D 1/565 |
| 2022/0332157 A1* | 10/2022 | Barrios Albert | B60D 1/565 |
| 2024/0308284 A1* | 9/2024 | Harris | B60D 1/04 |

FOREIGN PATENT DOCUMENTS

| | | | | |
|---|---|---|---|---|
| CN | 114083943 A | 2/2022 | | |
| DE | 102014004949 | * 11/2014 | ............ | B60D 1/243 |
| DE | 102014004949 A1 | 11/2014 | | |

(Continued)

*Primary Examiner* — Erick R Solis
(74) *Attorney, Agent, or Firm* — Dinsmore & Shohl LLP (57) ABSTRACT

A vehicle includes a frame member and a tow hook assembly coupled to the frame member. The tow hook assembly includes a tow hook positionable between a first position and a second position, and a locking mechanism operable between a locked position and an unlocked position to permit the tow hook to move into the second position. The vehicle further includes a contact sensor and an electronic control unit communicatively coupled to the tow hook assembly and the sensor, the electronic control unit configured to operate the locking mechanism into the unlocked position to permit the tow hook to be positioned into the second position upon the sensor detecting that a predetermined condition is satisfied.

15 Claims, 6 Drawing Sheets

(56) References Cited

FOREIGN PATENT DOCUMENTS

EP          2738024  A1    6/2014
EP          2724876  B1    11/2019
JP          06264555  A    1/2018

* cited by examiner

MOVABLE TOW HOOK ASSEMBLIES AND VEHICLES INCLUDING SAME

TECHNICAL FIELD

The present specification generally relates to tow hooks for vehicles and, more specifically, tow hooks that reduce contact with a barrier during a collision.

BACKGROUND

Current tow hooks may attach or be fixed to a vehicle at different connection points so that the tow hook is operable to remain on the vehicle while a towing force is applied to the tow hook. However, during a collision, the tow hook may contact a barrier that may cause further damage to internal components of the vehicle located rearward of the tow hook and to the barrier itself.

Accordingly, a need exists for improved tow hooks that reduce damage to components of the vehicle as well as to an object contacted by the vehicle during the collision.

SUMMARY

In one embodiment, a vehicle includes: a frame member; and a tow hook assembly coupled to the frame member, the tow hook assembly including: a tow hook positionable between a first position and a second position; and a locking mechanism operable between a locked position and an unlocked position to permit the tow hook to move into the second position; a contact sensor; and an electronic control unit communicatively coupled to the tow hook assembly and the sensor, the electronic control unit configured to operate the locking mechanism into the unlocked position to permit the tow hook to be positioned into the second position upon the sensor detecting that a predetermined condition is satisfied.

In another embodiment, a tow hook assembly includes: a tow hook movable between an extended position and a retracted position; and a pressure sensor coupled to the tow hook, wherein the tow hook moves from the extended position to the retracted position in response to the pressure sensor detecting a force exceeding a predetermined force threshold.

In yet another embodiment, a method includes: positioning a tow hook, movable between a first position and a second position, into the first position; positioning a locking mechanism, operable between a locked position and an unlocked position, into the locked position; and in response to determining a predetermined condition is satisfied, operating the locking mechanism into an unlocked position to permit the tow hook to be positioned into the second position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a vehicle including a frame member and a tow hook assembly coupled to the frame member. The tow hook assembly includes a tow hook positionable between a first position and a second position, and a locking mechanism operable between a locked position and an unlocked position to permit the tow hook to move into the second position. The vehicle further includes a contact sensor and an electronic control unit communicatively coupled to the tow hook assembly and the sensor, the electronic control unit configured to operate the locking mechanism into the unlocked position to permit the tow hook to be positioned into the second position upon the sensor detecting that a predetermined condition is satisfied. Various embodiments of the apparatus and operation of the apparatus are described in more detail herein. Whenever possible, the same reference numerals will be used throughout the drawings to refer to the same or like parts.

Figure 1:
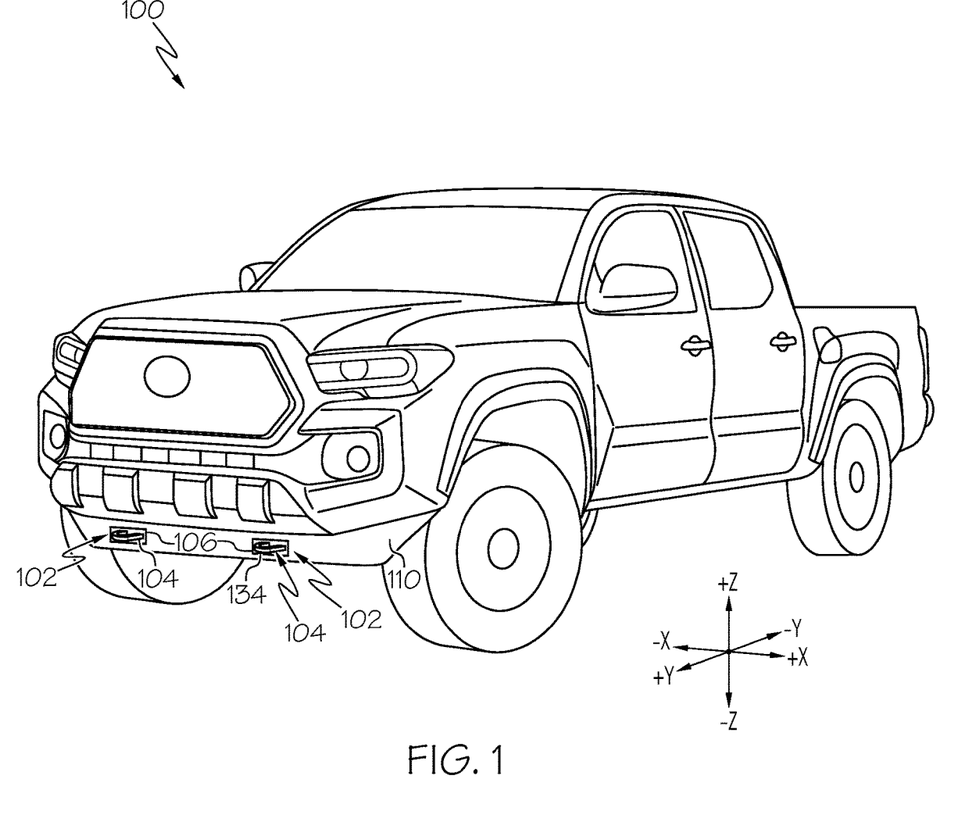
FIG. 1 schematically depicts a perspective view of a vehicle including a pair of tow hook assemblies, according to one or more embodiments shown and described herein.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a perspective view of a vehicle 100 is depicted. As used herein, a vehicle 100 may refer to any instrument that is operable to transport people and/or goods from one location to another. For example, the vehicle 100 may include, but is not limited to, an automobile, car, bus, truck, boat, and the like. The vehicle 100 may comprise one or more tow hook assemblies 102. As shown in FIG. 1, the vehicle 100 includes a pair of tow hook assemblies 102. Each tow hook assembly 102 may be connected to any portion of the vehicle 100. For example, in some embodiments, the tow hook assemblies 102 may be attached to a front bumper or bumper beam of the vehicle 100. More particularly, in embodiments, the tow hook assemblies 102 may be attached to extend above the bumper beam of the vehicle 100. In other embodiments, the tow hook assemblies 102 may be attached to extend below the bumper beam of the vehicle 100. For example, the tow hook assemblies 102 may be positioned to extend below the bumper beam of the vehicle 100 such that a tow hook of the tow hook assembly 102 may be configured to receive a tow strap extending in a vehicle longitudinal direction below the bumper beam of the vehicle 100. In some embodiments, as shown in FIG. 1, the tow hook assemblies 102 may include a tow hook 104 extending in a vehicle longitudinal direction such that at least a portion of the tow hook 104, which is mounted to the bumper beam, extends through an opening 106 formed in a bumper cover 108. The bumper cover 108 is positioned forward of the bumper beam in the vehicle longitudinal direction such that the bumper beam is not illustrated in FIG. 1.

Figure 2:
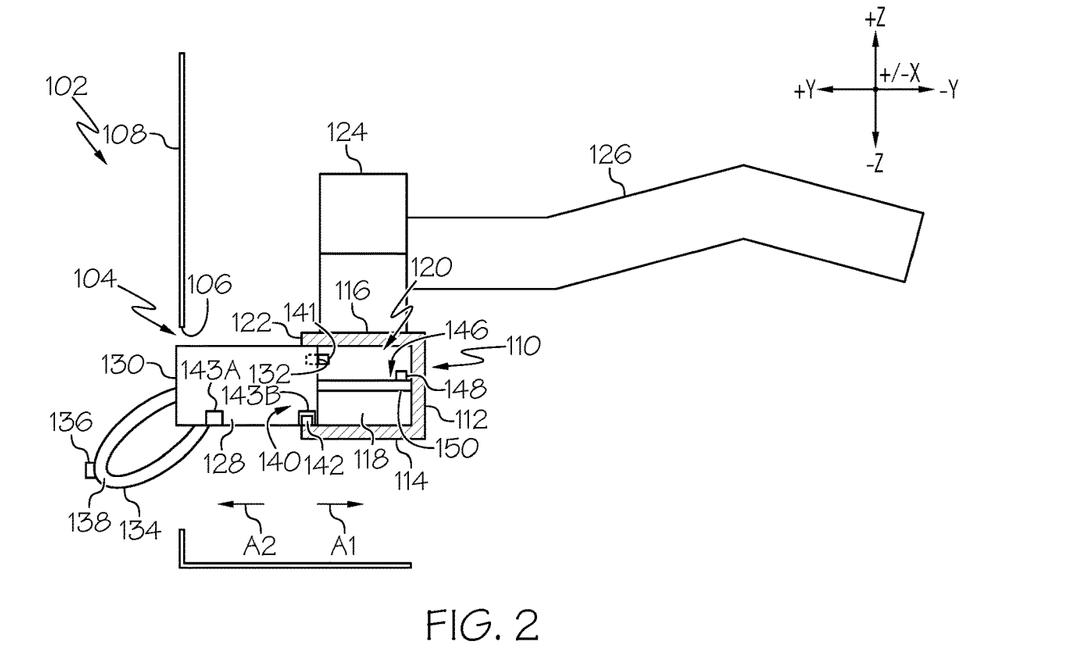
FIG. 2 schematically depicts a partial cross-sectional side view of the tow hook assembly of FIG. 1 including a tow hook in an extended position, according to one or more embodiments shown and described herein.
Figure 3:
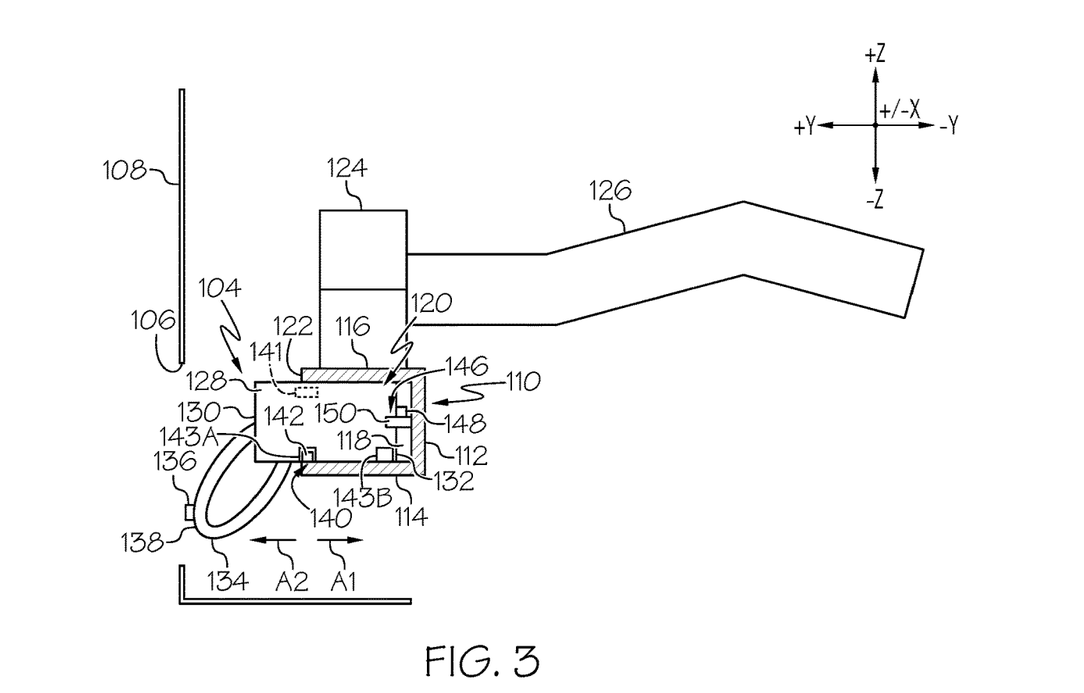
FIG. 3 schematically depicts a partial cross-sectional side view of the tow hook assembly of FIG. 1 including a tow hook in a retracted position, according to one or more embodiments shown and described herein.

Referring now to FIG. 2, the tow hook assembly 102 includes a housing 110 and the tow hook 104. The housing 110 includes a rear wall 112, a bottom wall 114, an upper wall 116 opposite the bottom wall 114, and a pair of side walls 118 that define an open interior 120. An aperture 122 is formed in the housing 110 opposite the rear wall 112 to permit the tow hook 104 to move between a first or extended position, as shown in FIG. 2, and a second or retracted position, as shown in FIG. 3, relative to the housing 110. Accordingly, the aperture 122 has any suitable geometry corresponding to a shape of the tow hook 104 such as, for example, circular, rectangular, or other regular or irregular shapes. The housing 110 is mounted to a frame member 124, such as the bumper beam, a crush box, or the like, in any suitable manner such as, for example, mechanical fasteners, clips, adhesive, or the like. In embodiments, the upper wall 116 of the housing 110 is fixed to the frame member 124. As shown in FIG. 2, the frame member 124 is provided rearward of the bumper cover 108 and a longitudinal rail 126 extends from the frame member 124 in the vehicle longitudinal direction opposite the bumper cover 108.

The tow hook 104 includes a tow hook body 128 having a front end 130 and a rear end 132 opposite the front end 130, and an attachment member 134. As discussed herein, the tow hook body 128 has a shape corresponding to the aperture 122 formed in the housing 110 such that the tow hook 104 is permitted to move through the aperture 122 and within the open interior 120 of the housing 110. The attachment member 134 may be fixed or rotatably coupled to the tow hook body 128, such as at the front end 130 of the tow hook body 128 or any other suitable location of the tow hook body 128. As shown in FIG. 2, the attachment member 134 has a loop shape extending from the front end 130 of the tow hook body 128. However, it should be appreciated that the attachment member 134 may have any suitable shape or size such that a tow strap may attach to the attachment member 134 and be located at any other suitable location of the tow hook 104, such as a lower surface or an upper surface of the tow hook body 128. Specifically, the attachment member 134 may have a hook shape, as shown in FIG. 1.

In embodiments, as described in more detail herein, the tow hook 104 includes a contact sensor 136 for detecting when a force is applied against the tow hook 104 in the rearward vertical longitudinal direction. The contact sensor 136 may be located on the tow hook body 128, such as on the front end 130 of the tow hook body 128, or a leading end 138 of the attachment member 134 opposite the tow hook body 128 to detect when the tow hook 104 contacts a barrier or obstacle. As shown, the contact sensor 136 is located on the leading end 138 of the attachment member 134. In embodiments, the contact sensor 136 may include any suitable device for detecting a force such as, for example, a pressure sensor, a strain gauge, a touch sensor, piezoelectric sensor, capacitive sensor, and the like.

It should be appreciated that when the tow hook 104 is positioned in the extended position, as shown in FIG. 2, the attachment member 134 extends through the opening 106 formed in the bumper cover 108 such that the attachment member 134 is positioned at least partially at an exterior side of the vehicle 100. Alternatively, when the tow hook 104 is positioned in the retracted position, as shown in FIG. 3, the tow hook 104 is received within the open interior 120 of the housing 110 such that a distance between the rear end 132 of the tow hook body 128 and the rear wall 112 of the housing 110 is less than a distance between the rear end 132 of the tow hook body 128 and the rear wall 112 of the housing 110 when the tow hook 104 is in the extended position. Additionally, when the tow hook 104 is in the retracted position, the attachment member 134 may not extend through the opening 106 formed in the bumper cover 108 such that the attachment member 134 is positioned rearward of the bumper cover 108. However, it should be appreciated that, in embodiments, the attachment member 134 may extend through the opening 106 formed in the bumper cover 108 when in the retracted position, but less than an amount of which the attachment member 134 extends through the opening 106 formed in the bumper cover 108 when the tow hook 104 is in the extended position.

The tow hook assembly 102 includes a locking mechanism 140 operable between a locked position and an unlocked position. In the unlocked position, movement of the tow hook 104 is permitted between the extended position and the retracted position. In the locked position, movement of the tow hook 104 is inhibited between the extended position and the locked position. Specifically, when the tow hook 104 is in the extended position and the locking mechanism 140 is in the locked position, the tow hook 104 is inhibited from moving into the retracted position. Once the locking mechanism 140 is moved to the unlocked position, the tow hook 104 is permitted to move from the extended position into the retracted position. Additionally, in embodiments, when the tow hook 104 is in the retracted position and the locking mechanism 140 is in the locked position, the tow hook 104 is inhibited from moving into the extended position. Once the locking mechanism 140 is moved to the unlocked position, the tow hook 104 is permitted to move from the retracted position into the extended position.

In embodiments, the locking mechanism 140 includes an electromagnet 141 provided within the open interior 120 of the housing 110 and located proximate the aperture 122 of the housing 110. When in the locked position, the electromagnet 141 is operated to magnetically engage the tow hook 104 to inhibit movement of the tow hook 104. When in the unlocked position, the electromagnet is operated to magnetically disengage the tow hook 104 to permit movement of the tow hook 104.

In other embodiments, the locking mechanism 140 includes a pin 142 provided on an inner surface of the housing 110 and extendable within the open interior 120 of the housing 110 to engage the tow hook body 128. For example, when in the locked position, the pin 142 is operated to engage the tow hook 104 by extending through a retracted notch 143A or an extended notch 143B formed as a recessed bottom surface in the tow hook body 128 to inhibit movement of the tow hook 104. When in the unlocked position, the pin 142 is operated to disengage the tow hook body 128. As described herein, the locking mechanism 140 may be operated between the locked position and the unlocked position in response to receiving instruction from an electronic control unit 144 (FIG. 4) of the vehicle 100.

In embodiments, the tow hook 104 may be passively operated to move relative to the housing 110 between the extended position and the retracted position, such as by an operator pushing the tow hook 104 into the housing 110 or pulling the tow hook 104 out of the housing 110 when the locking mechanism 140 is in the unlocked position. In other embodiments, the tow hook 104 may be mechanically actuated to move relative to the housing 110 between the extended position and the retracted position, such as by an actuating mechanism 146, in response to receiving instruction from the electronic control unit 144 of the vehicle 100, as described herein.

In embodiments, the actuating mechanism 146 is an actuator, such as a linear actuator, solenoid, or the like. The actuating mechanism 146 may include any suitable device for controlling movement of the tow hook 104 between the extended position and the retracted position. For example, the actuating mechanism 146 may include a rack and pinion, a threaded rod, a telescoping rod, screw gear, or the like engaging the tow hook body 128 and operated by a motor. As shown, the actuating mechanism 146 includes a motor 148 and a telescoping rod 150 extending between the housing 110 and the tow hook body 128 and operated by the motor 148. As shown in FIG. 2, when the tow hook 104 in the extended position, the telescoping rod 150 is extended. As the motor 148 is operated in a first state with the telescoping rod 150 extended, the telescoping rod 150 begins to retract in a moving direction, thereby drawing the tow hook 104 into the open interior 120 of the housing 110 in a rearward vehicle longitudinal direction A1 and toward the retracted position. As shown in FIG. 3, when the tow hook 104 is in the retracted position, the telescoping rod 150 is compressed. As the motor 148 is operated in a second state with the telescoping rod 150 compressed, the telescoping rod 150 begins to extend in a moving direction, thereby pushing the tow hook 104 out of the open interior 120 of the housing 110 in a forward vehicle longitudinal direction A2 opposite the rearward vehicle longitudinal direction A1 and toward the extended position.

Figure 4:
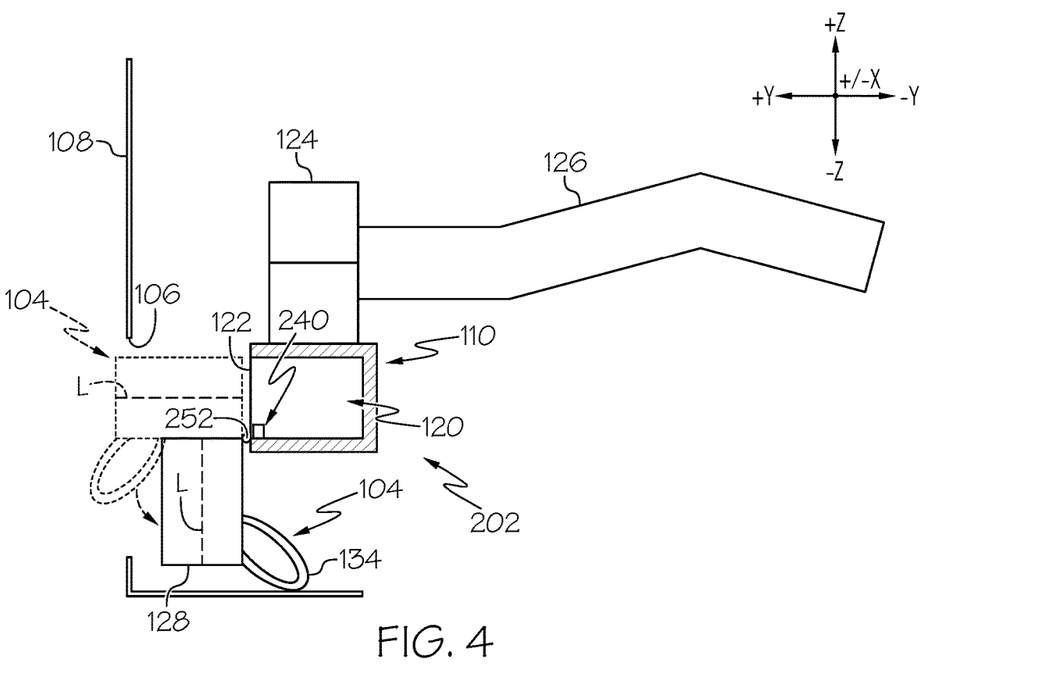
FIG. 4 schematically depicts a side view of another embodiment of a tow hook assembly, according to one or more embodiments shown and described herein.

Referring now to FIG. 4, a tow hook assembly 202 is depicted. It should be appreciated that the tow hook assembly 202 is similar to the tow hook assembly 102 depicted in FIGS. 2 and 3. Therefore, like reference numbers will be used to refer to like parts. However, rather than the tow hook 104 of the tow hook assembly 202 moving, either passively or mechanically, between an extended position and a retracted position within the open interior 120 of the housing 110, as discussed herein with respect to the tow hook assembly 102, the tow hook 104 is hingedly attached to the housing 110 and passively rotates relative to the housing 110 between a first position and a second position.

It should be appreciated that when the tow hook 104 is positioned in the first position, as shown in dashed lines, a longitudinal axis L of the tow hook body 128 extending between the front end 130 and the rear end 132 of the tow hook body 128 extends in the vehicle longitudinal direction. Additionally, the attachment member 134 extends through the opening 106 formed in the bumper cover 108 such that the attachment member 134 is positioned at least partially at the exterior side of the vehicle 100. Alternatively, when the tow hook 104 is positioned in the second position, as shown in solid lines, the attachment member 134 does not extend through the opening 106 formed in the bumper cover 108 and the tow hook 104 is positioned entirely rearward of the bumper cover 108. Additionally, when the tow hook 104 is in the second position, the front end 130 of the tow hook body 128 is positioned at a lower vertical position as compared to a position of the front end 130 of the tow hook body 128 when the tow hook 104 is in the first position.

With more particularity, the tow hook 104 is hingedly attached to the housing 110 by a hinge 252 having an axis of rotation extending parallel to the vehicle lateral direction. The tow hook 104 further includes a locking mechanism 240 operable between a locked position and an unlocked position for permitting movement of the tow hook 104 between the first position and the second position. Specifically, when the tow hook 104 is in the first position and the locking mechanism 240 is in the locked position, the tow hook 104 is not permitted to move into the second position. Once the locking mechanism 240 is moved to the unlocked position, the tow hook 104 may be permitted to move from the first position into the second position. Additionally, in embodiments, when the tow hook 104 is in the second position and the locking mechanism 240 is in the locked position, the tow hook 104 is not permitted to move into the first position. Once the locking mechanism 240 is moved to the unlocked position, the tow hook 104 may be permitted to move from the second position into the first position.

In embodiments, the locking mechanism 240 may fix the hinge 252 in either a first state when the tow hook 104 is in the first position, or a second state when the tow hook 104 is in the second position. In other embodiments, the locking mechanism 240 directly engages the tow hook 104 itself to fix the tow hook 104 in either the first position or the second position without independent control of the hinge 252. As described herein with respect to the locking mechanism 140 of the tow hook assembly 102, the locking mechanism 240 may include any suitable locking device such as, for example, an electromagnet, a pin selectively engaging the tow hook body 128 or the hinge 252, and the like. Similarly, the locking mechanism 240 may be operated between the locked position and the unlocked position in response to receiving instruction from the electronic control unit 144 of the vehicle 100. Accordingly, operation of the locking mechanism 240 is not described in detail herein.

Figure 5:
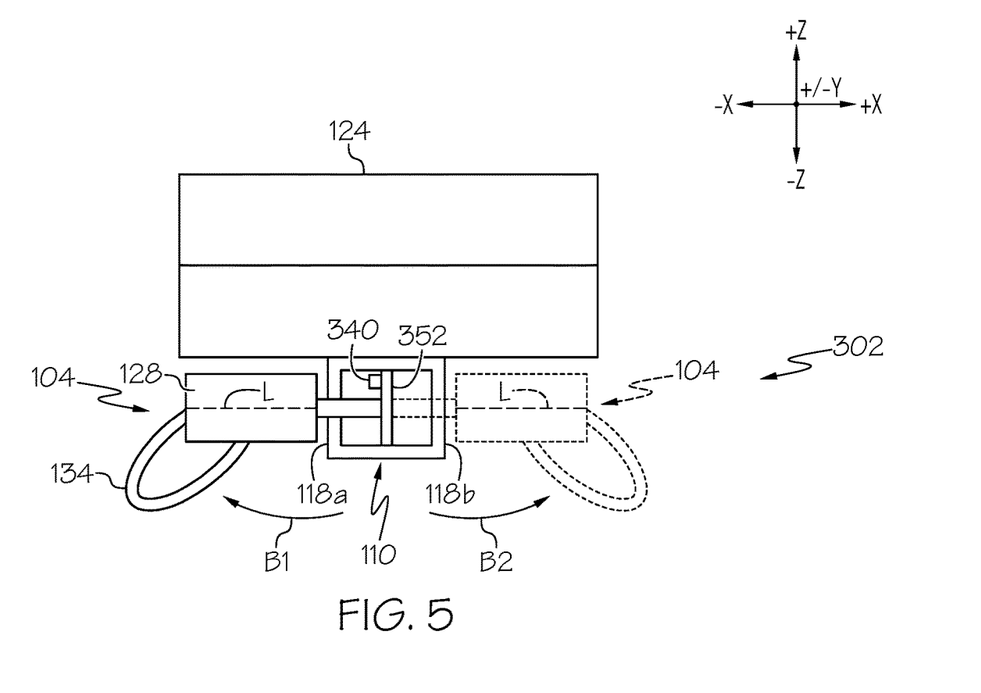
FIG. 5 schematically depicts a side view of another embodiment of a tow hook assembly, according to one or more embodiments shown and described herein.

Referring now to FIG. 5, a tow hook assembly 302 is depicted. It should be appreciated that the tow hook assembly 302 is similar to the tow hook assembly 202 depicted in FIG. 4. Therefore, like reference numbers will be used to refer to like parts. Rather than the tow hook 104 moving between a first position and a second position, as discussed herein with respect to the tow hook assembly 202, the tow hook 104 passively or actively rotates from a first position to either a second position or a third position.

Although the first position is not shown in FIG. 5, it should be appreciated that the first position is similar to the first position depicted in FIG. 4 such that the longitudinal axis L of the tow hook body 128 extends in the vehicle longitudinal direction. When the tow hook 104 is positioned in the second position, as shown in solid lines, the longitudinal axis L of the tow hook body 128 extends in the vehicle lateral direction. Additionally, the tow hook 104 is rotated in a first rotation direction B1 to be positioned at a first side wall 118a of the housing 110. Similarly, when the tow hook 104 is positioned in the third position, as shown in dashed lines, the longitudinal axis L of the tow hook body 128 extends in the vehicle lateral direction. However, the tow hook 104 is rotated in a second rotation direction B2 opposite the first rotation direction B1 to be positioned at a second side wall 118b of the housing 110 opposite the first side wall 118a of the housing 110.

With more particularity, the tow hook 104 is hingedly attached to the housing 110 by a hinge 352 having an axis of rotation extending parallel to the vehicle vertical direction. The tow hook 104 further includes a locking mechanism 340, similar to the locking mechanism 240 of the tow hook assembly 202 depicted in FIG. 4, operable between a locked position and an unlocked position for permitting movement of the tow hook 104 from the first position to either the second position or the third position. Specifically, when the tow hook 104 is in the first position and the locking mechanism 340 is in the locked position, the tow hook 104 is not permitted to move into either the second position or the third position. Once the locking mechanism 340 is moved to the unlocked position, the tow hook 104 may be permitted to move from the first position into either the second position or the third position. Additionally, in embodiments, when the tow hook 104 is in either the second position or the third position, and the locking mechanism 340 is in the locked position, the tow hook 104 is not permitted to move into the first position. Once the locking mechanism 340 is moved to the unlocked position, the tow hook 104 may be permitted to move from either the second position or the third position into the first position.

In embodiments, the locking mechanism 340 may fix the hinge 352 in either a first state when the tow hook 104 is in the first position, a second state when the tow hook 104 is in the second position, or a third state when the tow hook 104 is in the third position. In other embodiments, the locking mechanism 340 directly engages the tow hook 104 itself to fix the tow hook 104 in either the first position, the second position, or the third position without independent control of the hinge 352. As described herein with respect to the locking mechanism 140 of the tow hook assembly 102 depicted in FIGS. 2 and 3 and the locking mechanism 240 of the tow hook assembly 202 depicted in FIG. 4, the locking mechanism 340 may include any suitable locking device such as, for example, an electromagnet, a pin selectively engaging the tow hook body 128 or the hinge 352, and the like. Similarly, the locking mechanism 340 may be operated between the locked position and the unlocked position in response to receiving instruction from the electronic control unit 144 of the vehicle 100. Accordingly, operation of the locking mechanism 340 is not described in detail herein.

Figure 6:
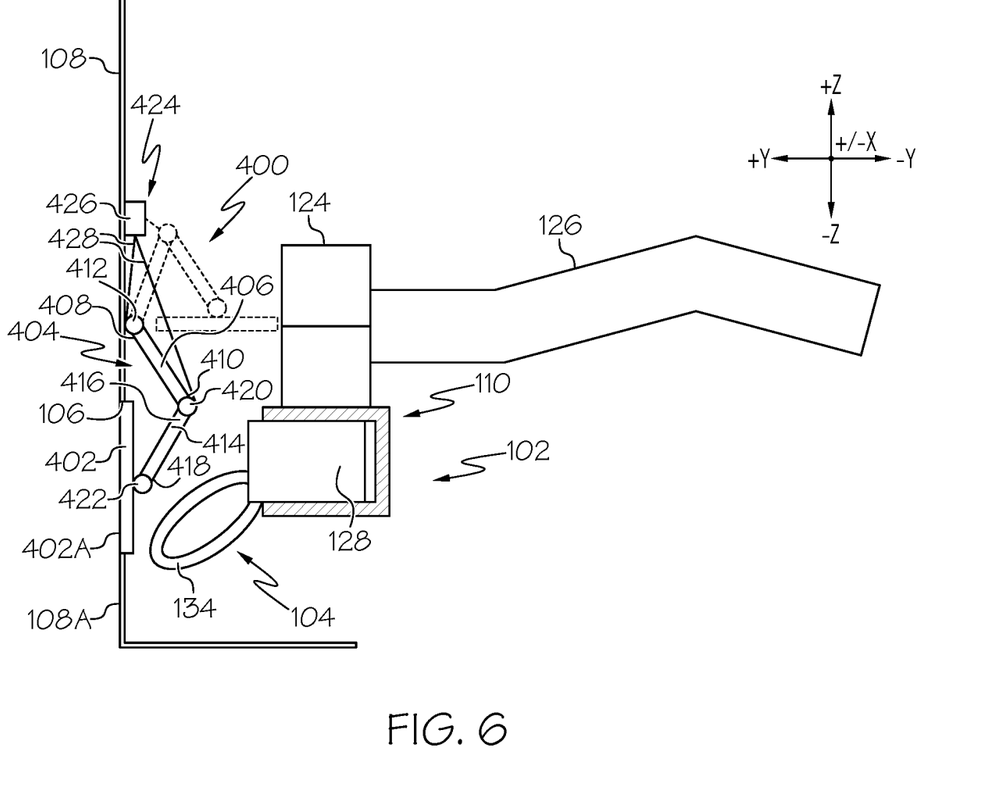
FIG. 6 schematically depicts a side view of the tow hook assembly of FIG. 2 and a tow hook cover, according to one or more embodiments shown and described herein.

Referring now to FIG. 6, a tow hook cover 400 is illustrated in combination with the tow hook assembly 102 for covering or inhibiting access through the opening 106 formed in the bumper cover 108 when the tow hook 104 is in the retracted position. However, it should be appreciated that the tow hook cover 400 may be utilized in combination with either tow hook assemblies 202, 302 described herein.

The tow hook cover 400 is operable between an uncovered position, shown in dashed lines, and a covered position, shown in solid lines. When the tow hook cover 400 is in the uncovered position, the tow hook cover 400 is positioned away from the opening 106 formed in the bumper cover 108. This allows the tow hook 104 to be positioned in the extended position through the opening 106 without being obstructed by the tow hook cover 400. Alternatively, when the tow hook cover 400 is in the covered position, the tow hook cover 400 is positioned over or within the opening 106 formed in the bumper cover 108 to conceal the opening 106 and the tow hook 104. Specifically, an exterior surface 402A of a plate 402 of the tow hook cover 400 extends flush with an exterior surface 108A of the bumper cover 108. This may inhibit access to the tow hook 104 from the exterior side of the bumper cover 108.

In embodiments, the tow hook cover 400 includes a plate 402 and a linkage member 404 extending from the plate 402 to the bumper cover 108. In embodiments, the linkage member 404 includes one or more arms. As shown, the linkage member 404 includes a first arm 406 having a first end 408 and an opposite second end 410, a first hinge 412 hingedly connecting the first end 408 of the first arm 406 to the bumper cover 108, a second arm 414 having a first end 416 and a second end 418 opposite the first end 416, a second hinge 420 hingedly connecting the first end 416 of the second arm 414 to the second end 410 of the first arm 406, and a third hinge 422 hingedly connecting the second end 418 of the second arm 414 to the plate 402. It should be appreciated that the tow hook cover 400 may include any other suitable structure not described herein such as, for example, a sliding door provided within the bumper cover 108 or adjacent the bumper cover 108 to positionable to conceal the opening 106.

In embodiments, the tow hook cover 400 may be passively operated to move between the uncovered position and the covered position, such as by an operator pushing the tow hook cover 400 or pulling the tow hook cover 400. In other embodiments, the tow hook cover 400 may be mechanically actuated to move between the uncovered position and the covered position, such as by an actuating mechanism 424, in response to receiving instruction from the electronic control unit 144 of the vehicle 100, as described herein.

The actuating mechanism 424 may include any suitable device for controlling movement of the tow hook cover 400 between the uncovered position and the covered position. For example, the actuating mechanism 424 may include one or more actuators operated by a motor. As shown, the actuating mechanism 424 includes a motor 426 operatively coupled to the linkage member 404 by one or more actuators 428 and configured to operate the linkage member 404. The one or more actuators 428 may extend from the motor 426 and any suitable components of the linkage member 404.

Figure 7:
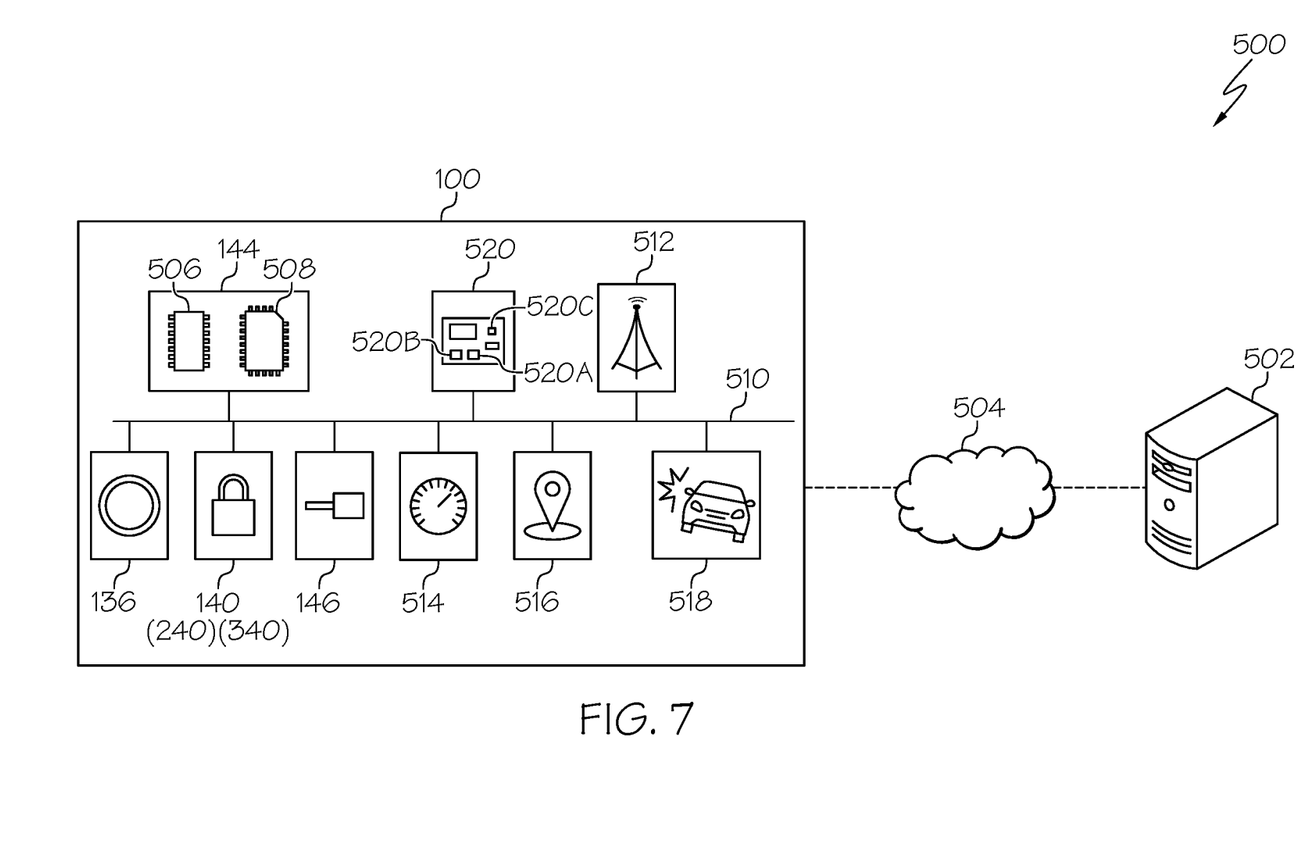
FIG. 7 schematically depicts a vehicle system, according to one or more embodiments shown and described herein.

Referring now to FIG. 7, a vehicle system 500 is depicted. In embodiments, the vehicle system 500 includes the vehicle 100 and a server 502 configured to communicate with the vehicle 100 via a network 504. As discussed in more detail herein, the vehicle 100 is configured to receive data from the server 502 via the network 504.

The server 502 may be a remote server such as a cloud server. In some embodiments, the server 502 may be a local server including, but not limited to, a roadside unit, an edge server, and the like. The server 502 may communicate with the vehicle 100 in an area covered by the server 502. The server 502 may communicate with other servers that cover different areas. The server 502 may communicate with a remote server and transmit information collected by the server 502 to the remote server.

In one embodiment, the network 504 may include one or more computer networks (e.g., a personal area network, a local area network, or a wide area network), cellular networks, satellite networks and/or a global positioning system and combinations thereof. Accordingly, the vehicle 100 and the server 502 may be communicatively coupled to the network 504 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, Zig-Bee, and/or other near field communication protocols. Suitable cellular networks include, but are not limited to, technologies such as LTE, WiMAX, UMTS, CDMA, and GSM.

The vehicle 100 includes the electronic control unit 144, which includes one or more processors 506 and one or more memory modules 508. Each of the one or more processors 506 may be any device capable of executing machine readable and executable instructions. Accordingly, each of the one or more processors 506 may be a controller, an integrated circuit, a microchip, a computer, or any other computing device. The one or more processors 506 are coupled to a communication path 510 that provides signal interconnectivity between various modules of the vehicle 100. Accordingly, the communication path 510 may communicatively couple any number of processors 506 with one another, and allow the modules coupled to the communication path 510 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 510 may be formed from any medium that is capable of transmitting a signal such as, for example, conductive wires, conductive traces, optical waveguides, or the like. In some embodiments, the communication path 510 may facilitate the transmission of wireless signals, such as WiFi, Bluetooth®, Near Field Communication (NFC) and the like. Moreover, the communication path 510 may be formed from a combination of mediums capable of transmitting signals. In one embodiment, the communication path 510 comprises a combination of conductive traces, conductive wires, connectors, and buses that cooperate to permit the transmission of electrical data signals to components such as processors, memories, sensors, input devices, output devices, and communication devices. Accordingly, the communication path 510 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the electronic control unit 144 includes one or more memory modules 508 coupled to the communication path 510. The one or more memory modules 508 may comprise RAM, ROM, flash memories, hard drives, or any device capable of storing machine readable and executable instructions such that the machine readable and executable instructions can be accessed by the one or more processors 506. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 508. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 7, the vehicle 100 includes network interface hardware 512 for communicatively coupling the vehicle 100 to the server 502. The network interface hardware 512 can be communicatively coupled to the communication path 510 and can be any device capable of receiving and transmitting data via the network 504. Accordingly, the network interface hardware 512 can include a communication transceiver for sending and/or receiving any wired or wireless communication. For example, the network interface hardware 512 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 512 includes hardware configured to operate in accordance with the Bluetooth® wireless communication protocol. For example, the network interface hardware 512 of the vehicle 100 may receive the data, such as location data, from the server 502.

In embodiments, the vehicle 100 includes the contact sensor 136 as a pressure sensor and the locking mechanism 140 depicted in FIGS. 2 and 3 communicatively coupled to the other components of the vehicle 100 via the communication path 510. However, it should be appreciated that the vehicle 100 may alternatively include the locking mechanism 240 depicted in FIG. 4 or the locking mechanism 340 depicted in FIG. 5. As described herein, the pressure sensor detects a force applied against the tow hook 104 in the rearward vertical longitudinal direction. The pressure sensor transmits a signal as a vehicle input to the one or more processors 506 indicating the detected force. In response to the one or more processors 506 determining that the detected force exceeds a predetermined force threshold, the one or more processors 506 concludes that a predetermined condition is satisfied. In embodiments, the predetermined force threshold is 1 kilonewton (kN)+/−10%. In embodiments, the predetermined force threshold is 1 kN+/−20%. In embodiments, the predetermined force threshold is 1 kN+/−30%. In embodiments, the predetermined force threshold is 1 kN+/−40%. In embodiments, the predetermined force threshold is 1 kN+/−50%.

In embodiments, the vehicle 100 includes the contact sensor 136 as a capacitance or touch sensor and the locking mechanism 140 depicted in FIGS. 2 and 3 communicatively coupled to the other components of the vehicle 100 via the communication path 510. However, it should be appreciated that the vehicle 100 may alternatively include the locking mechanism 240 depicted in FIG. 4 or the locking mechanism 340 depicted in FIG. 5. As described herein, the capacitance sensor detects a capacitance applied against the tow hook 104 in the rearward vertical longitudinal direction. The capacitance sensor transmits a signal as a vehicle input to the one or more processors 506 indicating the detected capacitance. In response to the one or more processors 506 determining that the detected capacitance exceeds a predetermined capacitance threshold, the one or more processors 506 concludes that a predetermined condition is satisfied. In embodiments, the predetermined capacitance threshold is 1 picofarad (pf)+/−10%. In embodiments, the predetermined capacitance threshold is 1 pf+/−20%. In embodiments, the predetermined force threshold is 1 pf+/−30%. In embodiments, the predetermined capacitance threshold is 1 pf+/−40%. In embodiments, the predetermined capacitance threshold is 1 pf+/−50%.

In embodiments, the vehicle 100 includes a speed sensor 514 communicatively coupled to the other components of the vehicle 100 via the communication path 510. The speed sensor 514 may be a conventional sensor provided at the transmission of the vehicle 100 for detecting gear rotation. In embodiments, the speed sensor 514 may be directly coupled to a speedometer of the vehicle 100 for determining a current speed of the vehicle 100. The speed sensor 514 transmits a signal as a vehicle input to the one or more processors 506 indicating a detected speed of the vehicle 100. In response to the one or more processors 506 determining that the detected speed exceeds a predetermined speed threshold, the one or more processors 506 concludes that a predetermined condition is satisfied.

In embodiments, the vehicle 100 includes a location sensor 516 communicatively coupled to the other components of the vehicle 100 via the communication path 510. The location sensor 516 may be, for example, a GPS transducer, configured to capture location data indicating a location of the vehicle 100. The location sensor 516 transmits a signal as a vehicle input to the one or more processors 506 including the location data. In response to the one or more processors 506 determining that the location data includes one or more data markers, the one or more processors 506 concludes that a predetermined condition is satisfied. In embodiments, the vehicle 100 itself determines whether the location data includes the one or more data markers. In other embodiments, the location data is transmitted to the server 502, which then determines whether the location data includes one or more data markers. The data markers may be indicative of the vehicle 100 traveling in a predetermined location where there is an increased likelihood of a collision such as, for example, a highway.

In embodiments, the vehicle 100 includes a collision sensor 518 communicatively coupled to the other components of the vehicle 100 via the communication path 510. The collision sensor 518 may include any suitable sensors for detecting a present or predicting an imminent vehicle collision such as, for LiDAR sensors, RADAR sensors, ultrasonic sensors, cameras, airbag sensors, piezoelectric sensors, proximity sensors, and the like. The collision sensor 518 transmits a signal including data as a vehicle input to the one or more processors 506 indicating a collision has occurred or is imminent. In response to the one or more processors 506 determining that a collision has occurred or is imminent, the one or more processors 506 concludes that a predetermined condition is satisfied.

In embodiments, the vehicle 100 includes a human machine interface 520 communicatively coupled to the other components of the vehicle 100 via the communication path 510. The human machine interface 520 includes one or more controls for selecting between various instructions to be sent to the tow hook 104 and/or the tow hook cover 400 discussed herein. The one or more controls may be any suitable user operating device such as, for example, buttons or the like. In some embodiments, the human machine interface 520 includes a touch screen, for selecting the instruction. In embodiments, the human machine interface 520 includes a lock input 520A, a tow hook input 520B, and a cover input 520C.

Upon actuation of the lock input 520A by a user of the vehicle 100, the electronic control unit 144 controls the lock mechanism 140, 240, 340 to move from the unlocked position to the locked position or move from the locked position to the unlocked position, which, in embodiments, allows the tow hook 104 to passively move from the extended position to the retracted position.

Upon actuation of the tow hook input 520B by the user of the vehicle 100, the electronic control unit 144 controls the actuation mechanism 146 to move from the retracted position to the extended position or move from the extended position to the retracted position. In other embodiments, actuation of the tow hook input 520B by the user of the vehicle 100 may result in operation of the hinge 252. The electronic control unit 144 may also control the lock mechanism 140, 240, 340 to move from the locked position to the unlocked position prior to the actuation mechanism 146 moving from the extended position to the retracted position or moving from the retracted position to the extended position.

Upon actuation of the cover input 520C by the user of the vehicle 100, the electronic control unit 144 controls the cover mechanism 400 to move from the covered position to the uncovered position or to move from the uncovered position to the covered position. The electronic control unit 144 may also control the locking mechanism 140, 240, 340 to move from the locked position to the unlocked position prior to the actuation mechanism 146 moving from the extended position to the retracted position or moving from the retracted position to the extended position subsequent to the cover mechanism 400 moving from the covered position to the uncovered position or moving from the uncovered position to the covered position.

Figure 8:
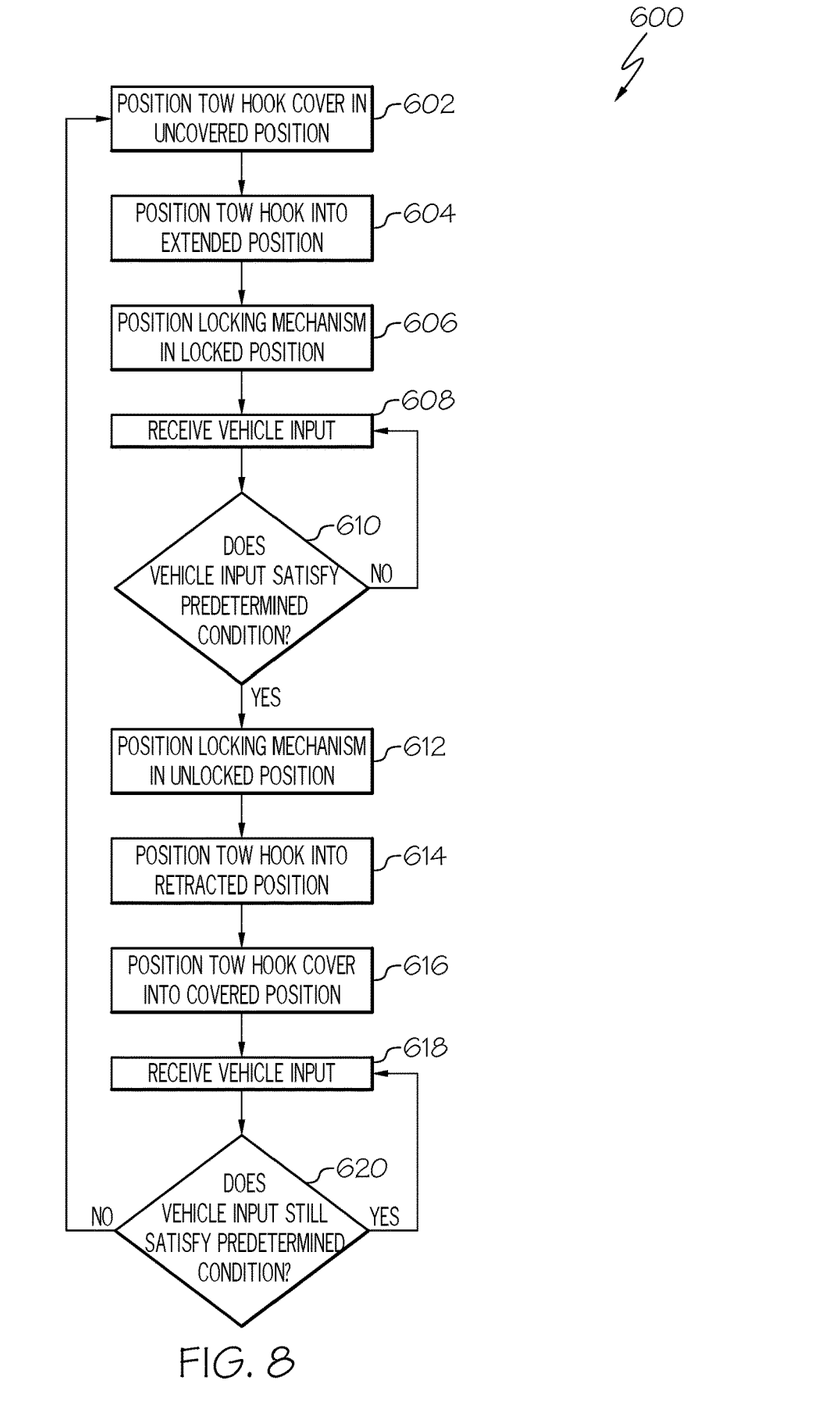
FIG. 8 schematically depicts a flowchart of a method for operating the tow hook assembly of FIG. 1 and the tow hook cover of FIG. 6, according to one or more embodiments shown and described herein.

Referring now to FIG. 8, a method 600 is depicted with reference FIGS. 1-7. Although reference is specifically made to the tow hook assembly 102 depicted in FIGS. 2 and 3. It should be appreciated that the method 600 described herein is equally applicable to the other embodiments, for example, the tow hook assemblies 202, 302, which may be passively operated.

At step 602, the tow hook cover 400 is positioned into the uncovered position by the actuating mechanism 424 such that the plate 402 of the tow hook cover 400 is positioned away from the opening 106 formed in the bumper cover 108. With the tow hook cover 400 in the uncovered position, the tow hook 104 is permitted to be positioned into the extended position by the actuating mechanism 146 at step 604. Thereafter, at step 606, the locking mechanism 146 is positioned into the locked position to maintain the tow hook 104 in the extended position. As such, the tow hook 104 is not permitted to move from the extended position into the retracted position.

At step 608, a vehicle input is received. The vehicle input may be any data collected by at least one of the contact sensor 136, the speed sensor 514, the location sensor 516, and the collision sensor 518. For example, the data may include a force being applied against the tow hook 104 detected by the contact sensor 136, a speed of the vehicle 100 detected by the speed sensor 514, a location of the vehicle 100 detected by the location sensor 516, or collision data detected by the collision sensor 518. Additionally, vehicle input may be received by the human machine interface 520 such as by an occupant of the vehicle 100 selecting one or more buttons to control operation of the tow hook 104.

At step 610, the one or more processors 506 determine whether the vehicle input satisfies a predetermined condition. Non-limiting examples of the vehicle input satisfying the predetermined condition may include a force detected by the contact sensor 136 exceeding a predetermined force threshold, a speed detected by the speed sensor 514 exceeding a predetermined speed threshold, a location of the vehicle 100 detected by the location sensor 516 corresponding to a predetermined location, and data collected by the collision sensor 518 indicating a vehicle collision. If the one or more processors 506 determine that the vehicle input does not satisfy a predetermined condition, the method 600 returns to step 608 to continue receiving additional vehicle input. Alternatively, if the one or more processors 506 determine that the vehicle input does satisfy a predetermined condition, the method 600 proceeds to step 612.

At step 612, in response to determining that a predetermined condition has been satisfied, the locking mechanism 140 is positioned into the unlocked position to permit the tow hook 104 to be moved from the extended position. Thereafter, at step 614, the tow hook 104 is positioned into the retracted position by the actuating mechanism 146. With the tow hook 104 positioned in the retracted position, the tow hook cover 400 is positioned into the covered position by the actuating mechanism 424 at step 616 to cover the opening 106 formed in the bumper cover 108.

Thereafter, at step 618, additional vehicle input collected by the various sensors described herein is received at the one or more processors 506. At step 620, the one or more processors 506 determines whether the additional vehicle input continues to satisfy a predetermined condition. The predetermined condition may be the same predetermined condition determined to be satisfied at step 610 or may be a different predetermined condition. If the one or more processors 506 determine that the vehicle input still satisfies a predetermined condition, the method 600 returns to step 618 to continue receiving additional vehicle input. Alternatively, if the one or more processors 506 determine that the additional vehicle input does not satisfy a predetermined condition, the method 600 returns to step 602 to position the tow hook cover 400 in the uncovered position to permit the tow hook 104 to be extend through the opening 106 formed in the bumper cover 108.

From the above, it is to be appreciated that defined herein is a vehicle including a frame member and a tow hook assembly coupled to the frame member. The tow hook assembly includes a tow hook positionable between a first position and a second position, and a locking mechanism operable between a locked position and an unlocked position to permit the tow hook to move into the second position. The vehicle further includes a contact sensor and an electronic control unit communicatively coupled to the tow hook assembly and the sensor, the electronic control unit configured to operate the locking mechanism into the unlocked position to permit the tow hook to be positioned into the second position upon the sensor detecting that a predetermined condition is satisfied.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a frame member; and
    a tow hook assembly coupled to the frame member, the tow hook assembly comprising:
        a housing;
        a tow hook positionable between a first position and a second position, the tow hook movable relative the housing between the first position and the second position, the first position being an extended position and the second position is a retracted position such that the tow hook moves within the housing, and a moving direction of the tow hook between the extended position and the retracted position extending parallel to a vehicle longitudinal direction; and
        a locking mechanism operable between a locked position and an unlocked position to permit the tow hook to move into the second position;
    a contact sensor; and
    an electronic control unit communicatively coupled to the tow hook assembly and the sensor, the electronic control unit configured to operate the locking mechanism into the unlocked position to permit the tow hook to be positioned into the second position upon the sensor detecting that a predetermined condition is satisfied.

2. The vehicle of claim 1, further comprising a speed sensor detecting a speed of the vehicle, wherein the predetermined condition is satisfied when the speed sensor detects a speed exceeding a predetermined speed threshold.

3. The vehicle of claim 1, further comprising a location sensor detecting a location of the vehicle, wherein the predetermined condition is satisfied when the location sensor detects a predetermined location of the vehicle.

4. The vehicle of claim 1, further comprising a collision sensor, wherein the predetermined condition is satisfied when data collected by the collision sensor indicates a vehicle collision.

5. The vehicle of claim 1, wherein the contact sensor is a pressure sensor coupled to the tow hook, the predetermined condition is satisfied when the pressure sensor detects a force exceeding a predetermined force threshold.

6. The vehicle of claim 1, further comprising a tow hook cover positionable between an uncovered position and a covered position to conceal the tow hook when in the second position.

7. The vehicle of claim 1, further comprising an actuating mechanism for positioning the tow hook between the first position and the second position.

8. The vehicle of claim 7, wherein the actuating mechanism comprises a telescoping rod and a motor for operating the telescoping rod, the telescoping rod extending between a rear wall of the housing and a rear end of the tow hook.

9. A tow hook assembly comprising:
    a tow hook movable between an extended position and a retracted position; and
    an electronic pressure sensor coupled to the tow hook, wherein the tow hook moves from the extended position to the retracted position in response to the pressure sensor detecting a force exceeding a predetermined force threshold.

10. The tow hook assembly of claim 9, wherein the tow hook comprises:
a tow hook body; and
an attachment member extending from the tow hook body, the pressure sensor provided on a leading end of the attachment member.

11. The tow hook assembly of claim 9, wherein the predetermined force threshold is 1 kN+/−50%.

12. A method comprising:
positioning a tow hook, movable relative to a housing of a tow hook assembly of a vehicle between a first position and a second position, into the first position, wherein the first position is an extended position and the second position is a retracted position such that the tow hook moves within the housing, and a moving direction of the tow hook between the extended position and the retracted position extending parallel to a vehicle longitudinal direction;
positioning a locking mechanism, operable between a locked position and an unlocked position, into the locked position; and
in response to determining a predetermined condition is satisfied, operating the locking mechanism into an unlocked position to permit the tow hook to be positioned into the second position.

13. The method of claim 12, wherein the predetermined condition is satisfied when at least one of a speed sensor detects a speed exceeding a predetermined speed threshold, a location sensor detects a predetermined location of a vehicle, data collected by a collision sensor indicates a vehicle collision, or a pressure sensor detects a force exceeding a predetermined force threshold.

14. The method of claim 12, further comprising positioning a tow hook cover into a covered position from an uncovered position to conceal the tow hook in the second position in response to determining the predetermined condition is satisfied.

15. The method of claim 12, wherein the first position is an extended position and the second position is a retracted position such that the tow hook moves within a housing, and a moving direction of the tow hook between the extended position and the retracted position extends parallel to a vehicle longitudinal direction.

* * * * *

UNITED STATES PATENT AND TRADEMARK OFFICE
CERTIFICATE OF CORRECTION

| | | |
|---|---|---|
| PATENT NO. | : 12,502,918 B2 | Page 1 of 1 |
| APPLICATION NO. | : 18/415140 | |
| DATED | : December 23, 2025 | |
| INVENTOR(S) | : Haley L. Grantham et al. | |

It is certified that error appears in the above-identified patent and that said Letters Patent is hereby corrected as shown below:

On the Title Page

Item [73], assignee 2, city, delete "Toyota-shi" and insert --Toyota-shi Aichi-ken--, therefor.

In the Claims

In Column 14, Line 14, Claim 1, after "relative", insert --to--.

Signed and Sealed this
Third Day of February, 2026

John A. Squires
*Director of the United States Patent and Trademark Office*